INVENTOR
CHARLES R. JENSEN
ROBERT K. DENT
BY
ATTORNEY

United States Patent Office 3,546,688
Patented Dec. 8, 1970

1

3,546,688
ELECTRONIC BURGLAR ALARMS AND
TESTING CIRCUITRY THEREFOR
Charles R. Jensen, Lynnwood, and Robert K. Dent,
Seattle, Wash., assignors to Tyee Aircraft, Inc., Everett,
Wash., a corporation of Washington
Filed Dec. 1, 1967, Ser. No. 687,281
Int. Cl. G08b 29/00
U.S. Cl. 340—214　　　　　　　　　　　　　　4 Claims

ABSTRACT OF THE DISCLOSURE

This invention relates to an electronic burglar alarm circuitry and testing circuitry therefor. Particulars of this invention include circuitry normally in an operating mode but in a nonconducting mode and which circuitry is triggered by, and changes to conducting mode upon, the closing of normally open burglar alarm switch means, as by burglars or other intruders. Such switch means are associated in combination with input capacitors which are charged upon closing of said switch means and the charging of said capacitors causes a triggering impulse changing the circuitry from nonconducting mode to conducting mode. Preferably, there are a plurality of said switch means and associated capacitor combinations so that if one combination should become inoperative, or not operated by the intruder, others will provide adequate protection for the premises. Another feature of the invention is the use of a combination alarm switch means and a diode means coupled therewith for testing the circuitry by the flow of direct current in a reverse direction and thus permitting testing of the circuitry with said switch means remaining in normal open position.

---

Our invention relates to an electrically operated burglar alarm system and testing circuitry therefor.

More particularly, our invention relates to a burglar alarm having electronic circuitry which is normally in a nonconducting mode and is thus characterized by a minimum drain on the power supply. Thus, a battery power supply may be readily employed and will have a long life and thus practical needs for connecting to an external power supply are avoided. This further avoids a possibility of an intruder severing the external power lines to the premises and thus incapacitating the burglar alarm system.

Our business institutions, residential homes, summer cottages (to name only a few) have become a ready prey of burglars and generally during the hours when unoccupied. With modern conveniences, as lights, telephone, etc., it is not too difficult for burglars to determine time of unoccupancy and to then match their burglaring activities with periods of unoccupancy.

Also, most burglar alarm systems use electronic circuitry which is in conducting mode during normal operation and thus, for practical reasons, are connected to the power supply of the premises to be protected. Thus, such burglar alarms are vulnerable to the possibility of being inactivated by burglars by merely cutting the incoming power supply lines to the premises.

With our invention, such possibilities of cutting the

2 power supply lines is functionally indifferent as our invention may readily use a local power supply, as a battery, as our circuitry is normally in a nonconducting mode—thus resulting in a minimum drain on the power supply and eliminating any practical reason for the use of the regular supply of power to the premises being protected.

A further object of our invention is to provide a combination of a normally open, burglar alarm, electric switch and an associated input capacitor in series in a first direct current circuit so that upon closing of said switch means and charging of said capacitor, a triggering impulse results. Such triggering impulse is used in our invention to cause a second circuit, normally in operating mode but in nonconducting mode, to change to conducting mode and set off suitable burglar alarm warning devices.

A further object is to provide a plurality of said first circuits in electrical parallel relation to each other so that if a burglar should avoid closing one of said alarm switches, the probability is that he will not avoid the closing of the other of said switches.

A further object is to provide said first circuits with such characteristics so that if one thereof should be shorted, because of breakdowns from normal usage or because of intentional activities of a burglar, such shorting will not incapacitate the system to operate the burglar alarm warning devices upon the closing of other of said switches.

A further object is to utilize the triggering momentary impulse, emanating upon the closing of an alarm switch and the charging of its associated input capacitor, to operate an electronic timer circuit so that said momentary impulse signal causes a signal of a desired time duration.

A further object is to feed such signal of timed duration to a delay and pulser electronic circuit so that the signal emanating from the latter starts after a time delay period, and is intermittent in operation. Such intermittent signal causes an intermittent pulsing operatiton of audible or recordable burglar alarm warning devices.

A further object is to employ a combination of burglar alarm switch means and a diode coupled across the conductors leading from the switch means, so that by reverse flow of direct current, the circuitry can be tested and this without the closing of a normally open burglar alarm switch means.

Other objects of our invention will become inherent or will become implicit as the detailed description of our invention in connection with the drawings proceeds, wherein like reference numerals indicate like parts, and wherein.

Figure 2:
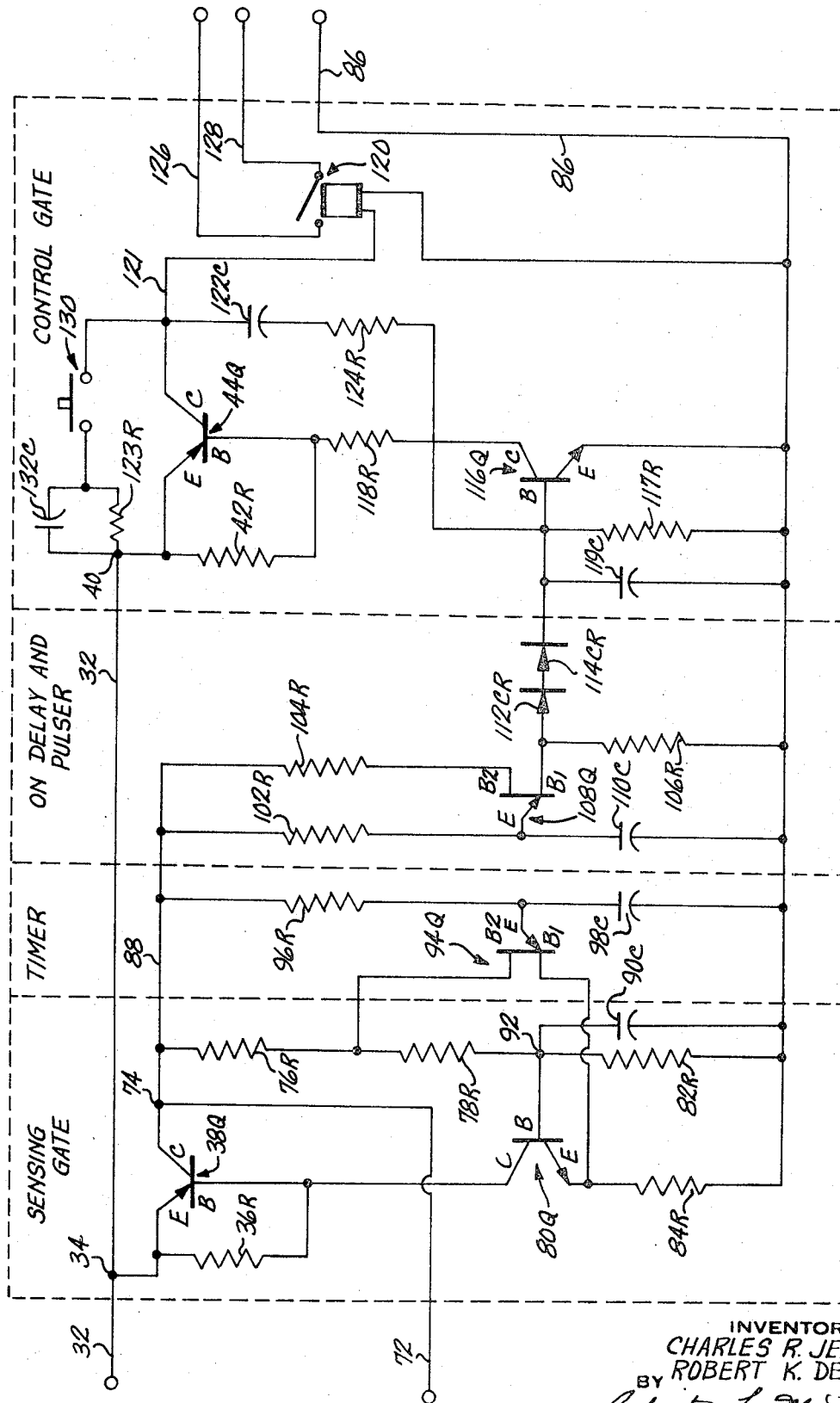
FIG. 2 is a view, on a larger scale, showing in detail the circuitry shown diagrammatically on FIG. 1 within the box labeled in FIG. 1 as "SEE FIG. 2 FOR CONTENTS HEREOF."

Referring generally to the drawings, the parts thereof will be introduced in the specification generally in numerical sequence and, in the drawings, the number of a part will be followed, in many instances, by a letter which is commonly used to designate the nature of the part involved, for example, the resistor 36 will be numbered on the drawings and referred to as resistor 36R; transistor 44, as transistor 44Q; capacitor 50, as 50C; diode 71, as 71CR; and the like. Thus, the nature of the parts can be identified in the drawings, when desired, without need to refer back to the description, by the symbolic representations in the drawings of the part, plus the letter following the number of the part. In FIG. 2 of the drawings, certain sections have functions which may be generally described and hence such sections are isolated by broken lines and the functions of such sections are indicated, for reference purposes and not as limitations, by the following terms set forth on the drawings: SENSING GATE, TIMER, ON DELAY AND PULSER, and CONTROL GATE.

A function selector 10 (FIG. 1) is utilized so that the circuitry may be in ON for normal operating condition, or OFF when the circuitry is inoperative and where individual circuits may be connected in circuitry for individual checking. This selector 10 comprises contactor arms 12 and 14 which are connected together by mechanical link 16 so that corresponding electrical connections are effected by the joint turning of the arms 12 and 14, such as turning them together to connect them, respectively, with their ON contact points 18 and 20, with their OFF contact points 22 and 24, respectively; or with contact points to energize a certain test circuitry, as will be detailed hereinafter.

When the function selector 10 is turned so that contactor arm 12 connects with contact point 18, and contactor arm 14 connects with contact point 20, electrical power is applied to the circuitry from any suitable source, such as battery 26—thus, the circuit, from the positive terminal of battery 26 (FIG. 1) along conductor 28, along conductor 30, along contact arm 12 to contact point 18 (because of the position of contactor arm 12), and along conductor 32. The usual hidden switch (not shown) is preferably employed so that the system may be turned to OFF or to ON and at locations remote from the protected premises. As such a switch is optional and conventional, the same has not been shown or claimed.

Now referring to FIG. 2, and particularly the section thereof bearing the legend SENSING GATE, the positive potential on said conductor 32 is applied to the juncture 34 between resistor 36R and transistor 38Q and is also applied to the juncture 40 between the resistor 42R and the transistor 44Q. While the circuitry is in ready mode, all of the transistors and their associated parts in the SENSING GATE are in nonconducting mode. They move to conducting mode upon the charging of an input capacitor as will be described.

In order to provide the desired burglar protection, a plurality of normally open alarm switches are provided on the protected premises and they may be secreted as desired and will move from open to closed position by the activities of the burglar, such as stepping upon devices, opening or closing doors, leaning against structure, walking about and interrupting light beams, moving through reflected radar beams, etc. As this invention does not claim any novelty, per se, in the switch actuating means for such alarm switches, only the foregoing short reference has been made thereto. Also, while such alarm switches are normally open, they may assume such open positions in response to another circuit being maintained closed and will move to closed position if said other circuit is interrupted. This again relates to switch actuating means. Thus, the normally open alarm switches, as employed herein, may be normally open in accordance with teachings of the prior art generally.

Figure 1:
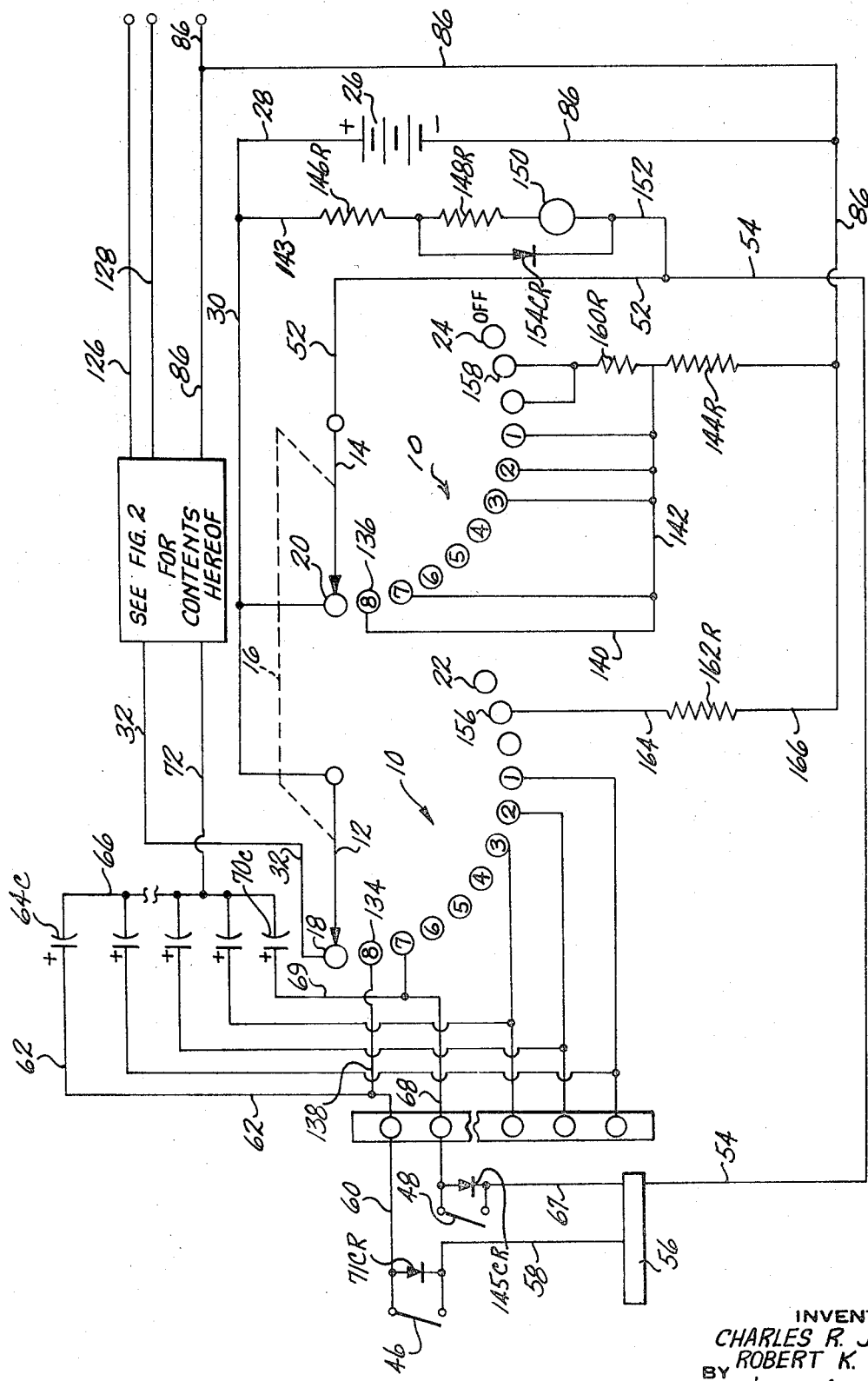
FIG. 1 is a wiring diagram of a device embodying our invention.

A plurality of alarm switches and circuits therefor are illustrated in FIG. 1. Also, each of the contact arms 12 and 14 may engage twelve different contact points to provide ON and OFF positions previously mentioned and circuitry for testing individual alarm circuits, later to be described. In the interest of brevity, only two of said test circuits are completed in the drawings, as the description later thereof will make obvious the connection for the remaining circuits. Also, only two alarm switches 46 and 48 and their circuits are completely drawn in FIG. 1 for the same purposes and with the same results.

When one of the alarm switches, as 46, is moved to closed position, such as by a burglar, positive potential is delivered from battery 26 to the capacitor 64C as follows: from battery 26 (FIG. 1), along conductors 28 and 30 to contact point 20, along contact arm 14 to conductor 52, along conductors 52 and 54 to buss bar 56, along conductor 58 to alarm switch 46 (now closed in view of the assumed position), along conductor 60, along conductor 62 to the capacitor 64C associated with alarm switch 46, and to common connector or buss bar 66. Thus, alarm switch 46 and its associated capacitor 64C are connected in series electrically between buss bar 56 and the common conductor 66. The remaining alarm switches and their associated capacitors are likewise connected in series between buss bar 56 and the common conductor 66, as is illustrated in the circuitry including alarm switch 48 and its associated capacitor 70C, which is: from buss bar 56, along conductor 67, through alarm switch 48, conductors 68 and 69, capacitor 70C to the common conductor 66. Also, the several series circuits just described are connected in parallel between the buss bar 56 and the common conductor 66.

In connection with the several circuits just described, no mention was made of the diodes illustrated, such as the diode 71CR. Such diode 71CR is oriented so it does not function with direct current flowing in the described direction. Description of the function of this diode 71CR, and its counterparts, will be described later in connection with test circuitry and with flow of direct current in the reverse direction.

From the common conductor 66 plus energy thereon will flow to conductor 72. From conductor 72 (now see FIG. 2), such plus energy will be delivered to the juncture 74.

Previously, the circuitry establishing plus energy to the juncture 34 was described and the circuitry was indicated as nonconducting. Such juncture 34 is connected to the emitter E of the transistor 38Q. With the establishment of plus energy to the juncture 74, connected to the collector C of the transistor 38Q, the plus side of the capacitor in the circuit (established by the burglar operating an alarm switch), as capacitor 64C, will charge to the power source 26 as follows: continuing from juncture 74, through resistor 76R, resistor 78R, transistor 80Q (base B thereof to emitter E thereof), resistor 84R, and common conductor 86 or negative side of the power source 26 (see also FIG. 1 as to common 86). The current flow to charge the capacitor 64C (FIG. 1), from conductor 32 (see now FIG. 2), and through transistor 80Q (base B to emitter E thereof) will cause transistor 80Q to change from nonconducting mode to conducting mode.

When transistor 80Q turns ON (changes to conducting mode), the path between its collector C and its emitter E becomes of low resistance. With such low resistance, conducting mode is established from the juncture 34: transistor 38Q (emitter E to base B thereof), transistor 80Q (C to E thereof), resistor 84R to common conductor 86. This will cause transistor 38Q to change from nonconducting mode or OFF to conducting or ON mode. This is caused by current flow through transistor 38Q (E to B), which is now sustained by power being applied to resistor 76R, resistor 78R, transistor 80Q, and resistor 84R to common 86.

Also, in the SENSING GATE section of FIG. 2 of the drawings, a capacitor 90C connects between the juncture 92 and the common conductor 86. The juncture 92 is between resistors 78R and 82R and the base B of the transistor 80Q. This purpose of such capacitor 90C is: to provide for by-passing to ground of outside interference signals (such as static, lightning, radio interference, automobile ignition emissions, etc.), which might inadvertently imitate a signal to the SENSING GATE. Thus, the SENSING GATE will not be responsive to outside interference signals and will respond only to the charging of a certain capacitor, as 64C or 70C.

Now that transistor 38Q is conducting, input power from the plus side of source 26 is applied through it to the conductor 88 connecting with the TIMER section indicated in FIG. 2 of the drawings. The signal emanating, upon the charging of a capacitor, as 64C or 70C, is momentary. This momentary signal triggers the SENSING GATE which in turn triggers the TIMER section. The TIMER section will function for a time duration determined by the parts therein and values of such parts. This TIMER comprises transistor 94Q, resistor 96R, and capacitor 98C—also resistor 76R functions. Resistor 96R and capacitor 98C form a R-C time constant circuit. Transistor 94Q is a unijunction transistor. Such unijunction transistor 94Q will remain at a fixed large resistance value (from its base B1 to its base B2) until the emitter E thereof conducts current and the transistor FIRES. This firing occurs when the proper voltage is applied to the emitter E (peak point voltage). This voltage is determined by: (1) the characteristics of the unijunction transistor 94Q, (2) the voltage applied to resistor 76R, and (3) by the value of the resistor 76R.

The voltage across the capacitor 98C, or at the emitter E of transistor 94Q rises slowly from 0 volts toward the power potential during operation. When this voltage reaches the "peak point voltage," transistor 94Q changes from a high resistance to a low resistance due to the voltage stored in capacitor 98C flowing through transistor 94Q (emitter E to base B1 thereof). When the transistor 94Q changes to a low resistance, current is shunted away from resistor 78R, transistor 80Q (base B to emitter E thereof), through transistor 94Q (base B2 to base B1) and through resistor 84R to common 86. When capacitor 58C discharges through transistor 94Q and resistor 84R, the voltage at the emitter E of transistor 80Q rises above the voltage at junction 92. This causes current to stop flowing in transistor 80Q (B to E). This resulting loss of current in transistor 80Q causes transistor 80Q to turn OFF, thus causing transistor 38Q to turn OFF. This resets the whole system to the ready mode (nonconducting mode) so that the circuitry will be again energized upon the closing of any of the burglar alarm switches, such as alarm switches 46, 48, and the like.

Upon closing of an alarm switch, such as alarm switch 46 (FIG. 1), its associated capacitor, as capacitor 64C, is charged and this sets up an energized time cycle in the TIMER circuit of FIG. 2. This cycle continues for a time period determined by the TIMER circuitry and is indifferent to any subsequent closing or opening of such alarm switch 46 of any other alarm switch during the said time period. Also, if one of said alarm switches, as 46, should remain closed (as by tampering actions of a burglar) this will not affect the ability of another alarm switch, as 48, to charge its associated capacitor, as 70C, and in turn set off the SENSING GATE and TIMER circuitry for another time period determined by the TIMER circuitry. This feature of the invention is of great value when devices thereof are located at remote places as often burglars will intentionally set off an alarm switch, if they can find the same, and then wait to see what happens. They may return the same day or days later and if they find no activities and feel that they have incapacitated the alarm system, they may continue with their burglary operations. However, with the present invention, the shorting out or closing of any one or more of the plurality of alarm switches does not incapacitate any remaining alarm switch to function and to operate the TIMER circuitry. This makes it very difficult for burglars to incapacitate the burglar alarm system as the various burglar alarm switches can be so located as to be very difficult for a burglar to determine the location of all of them. The shorting out or the permanent closing (as by a burglar) of one or more of the alarm switches will not place a substantial drain on the power supply. With any substantial drain on the power supply eventually the power source, as battery 26, will become exhausted and thus the burglar alarm system put out of operation. However, the amount of current needed to charge or maintain the charge of a capacitor, as 64C or 70C can be designed to be minimal.

To ensure nonconducting mode even with possibly leaky transistors, resistors 36R, 82R, 42R and 117R are provided and they assist a complete OFF or nonconducting mode of the transistors with which they are associated.

The TIMER section of the circuitry on FIG. 2 provides for a predetermined operation of signal or, in other words, a predetermined cycle during which the positive potential will appear on conductor 88. From conductor 88 (by circuitry hereinafter to be explained) suitable signal devices are operated and for a time period determined by the time cycle obtained from the TIMER during which said conductor 88 is at the positive potential of the power source 26. By changing values of resistor 96R and/or capacitor 98C, longer or shorter time signal durations may be obtained. The capacitors, as 64C and 70C, are of the standard type and will have some leakage—as sufficient internal leakage so as to discharge in about one-half hour. Thus, once a switch, as switch 46 or 48 is momentarily closed, its associated capacitor, as 64C or 70C will be charged and then in about a half hour the capacitor will be discharged. Thereafter, the associated switch 46 or 48 of the discharged capacitor, as 64C or 70C, will again be in ready mode for operation inadvertently by a burglar.

During the time that transistor 38Q is in the ON condition, or in other words, when the positive voltage of the source 26 is applied to the conductor 88, the section of the circuitry shown in FIG. 2 of the drawings under the legend ON DELAY AND PULSER will be in operation. The components of the ON DELAY AND PULSER section provide a pulsing intermittent signal which triggers a burglar alarm warning device to operate synchronously therewith. The resistor 102R, resistor 104R, resistor 106R, transistor 108Q, and capacitor 110C form a similar unijunction oscillator as described previously in connection with the TIMER section. Resistor 102R and capacitor 110C form the time constant, resistor 104R and resistor 106R determine the FIRE point of the transistor 108Q and this FIRE point occurs at the peak point voltage. When the voltage across the capacitor 110C reaches the FIRE point, transistor 108Q turns ON and discharges capacitor 110C through resistor 106R to a lower voltage, not to 0 as when transistor 38Q first turned ON. When the unijunction transistor 108Q turns OFF, or resets, the capacitor 110C again recharges and repeats the above operation until transistor 38Q turns OFF.

The difference in the voltage that capacitor 110C starts from at turn ON, 0 volts, and the voltage it starts from after the first firing operation is part of the delay function. It takes much longer to charge capacitor 110C to the first FIRE point from 0 volts than it does from the fired voltage. This delay in the first charging of capacitor 110C results in a delay in the first resulting operation of an alarm warning system (hereinafter described) and is a useful feature of our invention. Such delay eliminates possible correlation by a burglar between the actuation of an alarm switch, as 46 or 48, and the resulting operation of an alarm warning system which may be audible on the protected premises.

When transistor 108Q turns ON or FIRES, the voltage at resistor 106R rises rapidly to a more positive potential. When this voltage reaches a potential sufficient to forward bias diodes 112CR and 114CR and transistor 116Q (B to E junctions), then transistor 116Q turns ON. Transistor 116Q has its base B connected to the common 86 through resistor 117R and capacitor 119C for purposes previously described. When transistor 116Q turns ON, this connects resistor 118R to the common conductor 86. This causes current to flow from the power source (from conductor 32) through transistor 44Q (emitter E to base B thereof) in the CONTROL GATE section of FIG. 2, through resistor 118R and through transistor 116Q to the common conductor 86. This turns transistor 44Q ON, which applies power to the output relay 120 through conductor 121. Also, as the transistor 44Q is turned ON, power is also applied to the capacitor 122C. Capacitor 122C will then charge to the power voltage by way of resistor 124R and transistor 116Q (base B to emitter E path thereof). This current flowing thorough transistor 116Q (base B to emitter E thereof) will hold transistor 116Q ON until capacitor 122C has charged fully. At this time there is no voltage from the previous stage (from ON DELAY AND PULSER) so that transistor 116Q will turn OFF, transistor 44Q will turn OFF, and the circuit described in connection with CONTROL GATE will await the next firing of the transistor 108Q to turn ON again. This operation will repeat until transistor 38Q turns OFF, thus removing power from transistor 108Q. Capacitor 119C is utilized to provide interference protection in the circuit, similar to that provided by capacitor 90C in its circuit.

Conductors 126 and 128 are connected with any suitable alarm warning system (not shown) and they may be interconnected by any suitable means, such as a transistor switch, an output relay, etc.—an output relay 120 being illustrated in the drawings. Such alarm systems can be one which is readily heard on the protected premises or may be an alarm heard or recorded at a suitable remote location. Whether a local alarm on the premises is employed or an alarm at a remote location or a combination thereof depends upon police judgment as to the best requirements of individual premises.

A switch 130 is provided to test the operativeness of the alarm warning system. Upon closing of switch 130, current to charge capacitor 132C is provided to turn ON transistor 116Q and transistor 44Q for one cycle. Plus energy at juncture 40 will energize the said circuit upon closing of switch 130. Resistor 123R facilies testing of the operation of relay 120 as such resistor 123R will discharge capacitor 132 and thus permit rapid response to the intermittent closing of switch 130.

Various individual alarm circuits (typified by the presence of alarm switches 46 and 48, FIG. 1) may be readily checked without resorting to the actual closing of said switches and by the use of the function selector 10 and associated circuitry. For example, to check the alarm circuit (which includes switch 46), the contact arms 12 and 14 (FIG. 1) are turned to contact, respectively, the contact points 134 and 136. Tracing the circuit (involving switch 46) will make obvious the manner of testing each of the remaining circuits of the plurality of alarm circuits, eight being diagrammatically illustrated in FIG. 1 of the drawings and two being completed. Primarily, the current flow is in a reverse direction to that during the operating mode. Starting with source of energy, battery 26, the circuit is: conductors 28 and 30, contactor 12 (connected with contact point 134 because of the position of arm 12), contact point 134, conductor 138, conductor 60, diode 71CR (diode 71CR will now operate due to the reverse direction of energy flow), conductor 58, conductor 54, conductor 52, contactor 14 (connected with contact point 136 because of the now position of arm 14), contact point 136, conductor 140, conductor 142, and resistor 144R to common 86. Diode 71CR is connected across the conductors leading from switch 46 and becomes a part of a switch-diode combination. Also, each of the remaining alarm switches, as 48, has a similarly disposed diode, as diode 144CR, connected across the conductors leading from switch 48.

In the circuit just described, the diode 71CR has a definite voltage across it and of a predetermined value, such as .6 volt and no more or no less. The voltage across diode 71CR is determined by the value of resistor 144R and the semiconductor characteristics of said diode.

There is a volt meter parallel circuit between conductor 28 and conductor 54 (i.e., parallel with the circuit: conductors 28 and 30, contactor 12, contace point 134, conductor 138, conductor 60, diode 71CR, conductor 58, and conductor 54) which monitors the said predetermined voltage across the diode 71CR. This said parallel volt meter circuit comprises: conductor 143, resistor 146R, resistor 148R, meter 150, and conductor 152. Diode 154CR briges from the connection between resistors 146R and 148R and to conductor 152. The meter 150 is compressed by using the proper values of resistors 146R and 148R such that when the voltage across resistor 148R and meter 150 reaches the predetermined conduction voltage (.6 volt) of diode 154CR, diode 154CR turns ON and shunts resistor 148R and meter 150 and any additional current flows through diode 154CR. This prevents the meter 150 being subjected to voltage over its full scale, as one volt. This is done so that if the alarm circuit being tested (in the present instance, the alarm circuit including diode 71CR) has full voltage rather than the diode 71CR voltage (as for example, when conductors 58 and 60 are not interconnected by diode 71CR), this will prevent damage to the meter 150 and also gives a NO-GO full scale reading. A GO condition exists when the switch 46 is open, diode 71CR is presene across conductors 58 and 60 to switch 46 (preferably diode 71CR and switch 46 are made as a unit) which presents the diode 71CR voltage value (.6 volt) to the meter 150 for mid-scale reading (meter 150 reads full scale when 1 volt is present) and thus said mid-scale reading is a GO reading. If the alarm switch 46 is closed or conductors thereto shorted, a NO-GO zero reading will exist due to 0 volt being present where the diode voltage 71CR should be.

During normal operation of the alarm system, obviously, all test circuitry is inactive due to the selected position of the function selector mechanism 10.

In order to check the battery 26 and by use of the meter 150, the contactor arms 12 and 14 (FIG. 1) of the function selector 10 are moved to contact, respectively, the contact points 156 and 158. Parallel circuits are provided between the conductor 28, connected with the plus side of the battery 26, and the common conductor 86 connected to the minus side of the battery 26. One of the circuits (the volt meter circuit) is: conductor 28, conductor 30, conductor 143, resistor 146R, resistor 148R, meter 150, diode 154CR, conductor 152, conductor 52, contactor arm 14 (now connected to contact point 158 because of the assumed position of contactor arm 14), contact point 158, resistor 160R, resistor 144R, and to the common 86. The other of said parallel circiuts (the load circuit) is: conructor 28, conductor 30, contact arm 12 (now connected to contact point 156 because of the assumed position of contact arm 12), contact point 156, conductor 164, resistor 162R, conductor 166, and to the common 86. Meter 150 and resistor 148R were subjected to 0.6 volt because of action of diode 154CR in the previous circuit but meter 150 had full scale deflection when 6 volts were present between conductors 143 and 152. However, for battery checking it is desired to have meter 150 read on mid-scale deflection with a similar voltage and hence, resistor 160R is added in series to the circuit for testing battery 26. Thus, by the circuitry just described, an accurate check of the voltave of battery 26 may be directly read on the meter 150 (and at a mid-scale reading) when the contactor arms 12 and 14 of the function selector 10 are positioned as described.

From the test circuitry described, it will now be apparent that by the use of the function selector 10, each of the plurality of alarm circuits (each including a diode, as 71CR or 145CR) may be tested for operativeness without the necessity of closing any of the associated alarm switches (as 46 or 48) in the circuits. If any alarm switch in an alarm circuit should be closed or shorted out, such condition can be readily determined by the NO-GO response of meter 150. Further, the same volt meter circuitry that is used in testing the alarm circuits is used to test the voltage of the power source. This provides for test circuitry of maximum speed in operation so that only a meter of a few minutes is involved in determining whether the circuitry is in operative condition.

A further feature of this invention, which will now be apparent, is that the closing of any one of a plurality of alarm switches, such as 46 or 48, results in the charging of the associated capacitor, such as 64C or 70C, in the alarm circuit closed. Such a capacitor in charging provides an impulse so that the circuitry in the SENSING GATE (FIG. 2) changes from nonconducting mode to conducting mode. This energizes conductor 88 in the TIMER section and the same remains charged for a time period determined by the TIMER section. In other words, the TIMER section continues in conducting mode, regardless of whether the alarm switch initiating the operation remains closed, becomes open, or other alarm switches are closed. After a predetermined time cycle, the TIMER discontinues its conducting mode and then is ready for another cycle of operation to be initiated upon the closing of an alarm switch, and charging the associated capacitor with said alarm switch.

While the circuitry in the SENSING GATE and TIMER sections are in the conducting mode, the circuitry in the ON DELAY AND PULSER section likewise goes into ON position or into its conducting mode. When the circuitry of the ON DELAY AND PULSER section is in the conducting mode, the circuitry in the CONTROL GATE section goes into its conducting mode or is turned ON. This results in the output relay 120 (or its equivalent) being operated. Relay 120 operates for a time period determined by the TIMER section and has the delay and pulsing characteristics furnished by the ON DELAY AND PULSER section. In turn, relay 120 operates any suitable warning devices on or remote from the protected premises.

Thus, if a burglar should be able to find and render inoperative any one or even a number of the alarm switches (typified by alarm switches 46 and 48), this will not render the burglar alarm system inoperative. Obviously, there is the probability that he will not be able to find all of said alarm switches if they are properly secreted and located in connection with unexpected objects and situations on the protected premises. Also, the relation between the alarm switches and the circuitry which they operate is such that the said operated circuitry can well be successfully hidden from burglars so that they will either not find the same or will inadvertently cause closing of alarm switches in the attempt to seek and render the same inoperative.

Other features of our invention, which will now be apparent, include the provision of an electrically operated burglar alarm detection means comprising a plurality of normally open electric switches, as 46 or 48, which may be appropriately secreted about the protected premises to be inadvertently closed by an intruder. Each of said switches has an associated capacitor, as 64C or 70C, in electrical series relation in a first direct current circuit to provide a switch-capacitor combination, wherein the capacitor is charged upon the closing of the switch. Preferably, a plurality of such switches and circuits is provided, as eight thereof, diagrammatically illustrated in FIG. 1 of the drawings.

A SENSING circuit (or SENSING GATE) is connected with each of said first circuits. Said SENSING circuit is normally in nonconducting mode and changes to conducting mode upon the charging of a capacitor, as 64C or 70C. The SENSING circuit provides an electrical signal response, when in conducting mode, and provides such signal by a positive potential on the conductor 88. An electrically operated burglar, or intruder, alarm circuit typified by the output relay 120 is triggered, either directly or indirectly, by such a signal of positive potential on conductor 88.

While the signal of positive potential on conductor 88 may be directly used to trigger said relay 120, preferably, a timed, delayed and pulsing signal is provided so that audible alarms, operated by relay 120, will have the desired delay after closing of a switch, as 46 or 48, the desired duration of time, and the desired pulsing characteristics.

The desired time feature is accomplished by the direct current voltage on conductor 88 which triggers the TIMER circuit which also is normally in a nonconducting mode. Thus, a momentary impulse originating upon the charging of a capacitor, as 64C or 70C, triggers the TIMER circuit and an electrical signal impulse of desired time duration results. The said TIMER circuit preferably utilizes therein a unijunction transistor 94Q.

While again the signal impulse on conductor 88 may be used directly to trigger the relay 120, preferably, the said impulse is used to trigger the ON DELAY AND PULSER circuit to provide a delayed and pulsing impulse to trigger relay 120. The delay feature prevents correlation, by a burglar or intruder, between the occurrence of the closing of a switch, as 46 or 48, and the sounding of any signal audible on the protected premises by relay 120. The pulsing feature provides a synchronous, pulsing, and abnormal wailing sound (like a police siren) by alarm means operated by relay 120 to distinguish the sound from normal, non-emergency sounds, and the like. The said ON DELAY AND PULSER circuit also preferably utilizes a unijunction transistor 108Q.

Further, our invention provides for simple test circuitry characterized by diodes, as 71CR and 145CR, which become a part of switch, as 46 or 48, and diode, as 71CR and 145CR, combinations so that upon reversal to normal flow of direct current, the circuits involved may be rapidly checked and tested and this without the closing of any of the switches, as 46 or 48.

Obviously, changes may be made in the forms, dimensions, and the arrangements of the parts of our invention without departing from the principle thereof, the above setting forth only the preferred forms of embodiment of our invention.

We claim:

1. An electrically operated burglar detection means comprising, a normally open electric switch, adapted to be disposed about premises so as to be inadvertently closed by an intruder; a capacitor associated with said switch in electrical series relation in a first direct current electrical circuit to provide a switch capacitor combination wherein said capacitor is charged upon the closing of said switch; a sensing electrical circuit, connected with said first circuit, changing to conducting mode by the charging of said capacitor in the first circuit, and providing an electrical signal response when in conducting mode; a timer circuit providing an electrical signal impulse for a predetermined time period triggered by an electrical signal response from said sensing electrical circuit; a pulser circuit providing a pulsing intermittent signal impulse triggered by an electrical signal from said timer circuit; diode means triggered by a pulsing intermittent signal impulse from said pulser circuit; and an electrically operated burglar alarm circuit triggered by the electrical signal response of said diode means.

2. The combination of claim 1 wherein a transistorized control gate circuit is triggered by said diode means and said control gate circuit triggers said burglar alarm circuit.

3. An electrically operated detection means comprising a normally open electrical switch, adapted to be disposed about premises so as to be inadvertently closed by an intruder; a capacitor associated with said switch in electrical series relation in a first direct current electrical circuit to provide a switch-capacitor combination wherein said capacitor is charged by energy flowing in a given direction upon the closing of said switch; an electrically operated burglar alarm circuit triggered by charging of said capacitor; a diode connected across the terminals of said switch and oriented to function only during energy flow in a reverse direction; test circuitry for discontinuing energy flow in the given direction and providing energy flow in the reverse direction for testing said first circuit and with the switch thereof in open position; and a voltmeter responsive to the voltage value across the diode, whereby such voltage indication will indicate operativeness of the circuit which includes said diode.

4. The combination of claim 3 wherein the semi-conductor characteristic of said diode is of less conductance than said switch, whereby said voltage indication will indicate the position of said switch.

References Cited
UNITED STATES PATENTS

| | | | |
|---|---|---|---|
| 3,040,243 | 6/1962 | Weiss | 340—214 |
| 3,286,250 | 11/1966 | Teitelbaum | 340—276 |
| 3,381,286 | 4/1968 | Walsh | 340—213.1 |
| 3,422,398 | 1/1969 | Rubin | 340—276 |

DONALD J. YUSKO, Primary Examiner

U.S. Cl. X.R.

340—276